United States Patent Office 3,109,677
Patented Nov. 5, 1963

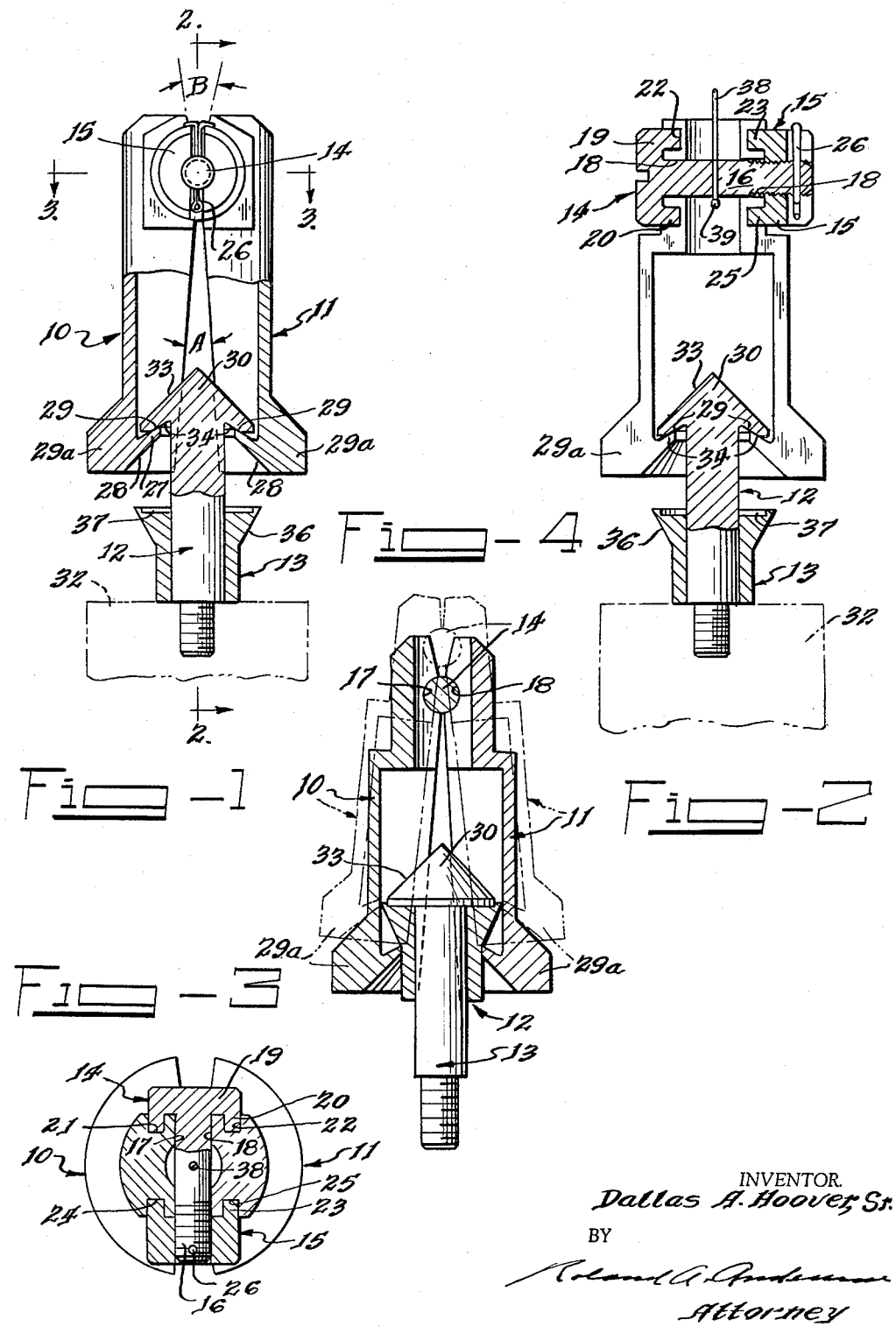

3,109,677
SELF-RELEASING GRAPPLING DEVICE
Dallas A. Hoover, Sr., Richland, Wash., assignor to the United States of America as represented by the United States Atomic Energy Commission
Filed Oct. 22, 1962, Ser. No. 232,316
4 Claims. (Cl. 294—110)

This invention relates to a grappling device capable of remote operation. More specifically, it relates to a grappling device that will not drop the object being grappled.

In the drawing:

FIG. 1 is a vertical sectional view of the grappling device of the present invention, showing the device in lifting position;

FIG. 2 is a vertical sectional view taken on the line 2—2 of FIG. 1;

FIG. 3 is a horizontal sectional view taken on the line 3—3 of FIG. 1; and

FIG. 4 is a vertical sectional view similar to FIG. 1 but showing the device in releasing position.

The novel grappling device of the present invention comprises essentially a pair of pivoted clamping jaws 10 and 11, a lifting lug 12 engageable by the jaws, and a releasing sleeve 13 on the lifting lug.

The clamping jaws 10 and 11 are pivotally connected to one another near their upper ends by means of bolt 14 and nut 15 threaded thereon. A shank 16 of the bolt 14 rests in opposed grooves 17 and 18 formed in the jaws 10 and 11, respectively, as shown in FIGS. 3 and 4. A head 19 of the bolt 14 has an annular flange 20 fitting arcuate grooves 21 and 22 formed in the jaws 10 and 11, respectively. The nut 15 has an annular flange 23 fitting arcuate grooves 24 and 25 formed in the jaws 10 and 11, respectively. Engagement of the annular flanges 20 and 23 on the bolt head 19 and the nut 15 with the arcuate grooves 21, 22, 24 and 25 in the jaws 10 and 11, holds the jaws together while permitting them to pivot with respect to one another about the bolt 14. A cotter pin 26 locks the nut 15 against rotation on the bolt 14.

Each of the clamping jaws 10 and 11 is holow or recessed and substantially semicylindrical, this being particularly true of the lower two thirds of each jaw, which is somewhat less than half a cylinder in order to pivot with respect to the other jaw, as is apparent in FIG. 1 from the small angles A and B formed between the facing edges of the jaws 10 and 11 at portions below the pivot bolt 14 and portions thereabove, respectively.

Each of the jaws 10 and 11 has at its lower end a substantially semicircular internal hook-shaped flange 27 directed away from the lower end of the jaw. Each flange 27 has a lower surface 28 which is conical at an angle, for example, of 45° to the horizontal, and an upper surface 29 which is conical at an angle, for example, of 30° to the horizontal. Each of the jaws 10 and 11 has at its lower end an external protuberance 29a extending thereabout, which acts as a weight to urge the particular clamping jaw moving it into the vertical position of FIG. 1, whereby the jaws tend to stay together at their lower ends.

The flanges 27 cooperate with an enlarged head 30 of a lifting lug 12 having its opposite end in threaded engagement with an object 32 to be lifted or moved about by the grappling device of the present invention. The head 30 has an upper conical surface 33 with an angle of, for example, 45° to the axis of the lifting lug 12, and a lower undercut conical surface 34 with an angle of, for example, 60° to the axis of the lifting lug. The surface 33 faces away from, and the surface 34, toward, a shank 16 of the lifting lug 12.

A releasing sleeve 13 is slidably mounted on the shank 16 and has near its upper end a conical surface 36 which faces away from the upper end of the shank and increases in diameter in a direction toward said upper end. The conical surface 36 has an angle of, for example, 30° to the axis of the sleeve 13. At the upper end of the sleeve there is a peripheral flange 37 which is adapted to overlie the peripheral edge of the lifting-lug head 30.

The grappling device of the present invention is adapted to be raised and lowered by a cable 38 which passes through a diametral opening in the bolt 14 and has an enlarged end 39 which transmits the pull on the cable to the bolt 14.

When the object 32 is to be lifted or moved, the jaws 10 and 11 are lowered by the cable 38 upon the lifting lug 12, which is already attached to the object 32. The conical surfaces 28 of the jaws 10 and 11 engage the conical surface 33 on the lifting-lug head 30, and, as a result, the jaws are cammed apart to permit the flanges 27 of the jaws to descend below the head 30. At this time the releasing sleeve 13 rests by its own weight against the object 32 in spaced relation to the head 30, as shown in FIGS. 1 and 2. The jaws 10 and 11 move toward one another under their own weight, more particularly, that of the protuberances 29a, bringing the flanges 27 beneath the lifting-lug head 30. Now the cable 38 is made to raise the jaws 10 and 11 bringing about engagement of the upper surfaces 29 of the flanges 27 with lower undercut surface 34 of the head 30, as shown in FIGS. 1 and 2. Because of the angle of these surfaces, upward pull on the jaws 10 and 11 urges them toward one another, maintaining engagement of the flanges 27 with the head 30. Now continued upward movement of the cable 38 acts through the jaws 10 and 11 and the lifting lug 12 to lift the object 32.

When the object 32 is to be disengaged from the grappling device, the object is lowered by the device until supported from below on something like the ground or floor. Lowering of the jaws 10 and 11 is continued until the flanges 27 contact the flange 37 of the releasing sleeve 13, the jaws are spread, and finally they engage the releasing sleeve below the conical surface 36 thereon. Now the jaws 10 and 11 are raised, carrying the relatively light releasing sleeve 13 to the position of FIG. 4, in which the sleeve engages the head 30 of the lifting lug 12. Thereafter, lifting of the sleeve 13 would involve lifting of the relatively heavy object 32, and so the jaws 10 and 11 move apart while moving up, because their flanges 27 slide along the conical surface 36 of the releasing sleeve 13 until the jaws are free of the releasing sleeve and the lifting lug 12 as shown by the broken-line position of the jaws in FIG. 4. During this action, the flanges 27 of the jaws 10 and 11 cannot engage the lower side of the lifting-lug head 30, for the sleeve 13 having been raised by the jaws against the head 30, protects the head from such engagement.

It is also understood that the invention is not to be limited by the details given herein but that it may be modified within the scope of the appended claims.

What is claimed is:

1. In combination,
   (A) a lifting lug comprising a shank and a head thereon having an external conical surface facing away from the shank and an undercut conical surface facing the shank,
   (B) a pair of pivoted clamping jaws, each jaw being substantially semicylindrical and hollow and having near one end a substantially semicircular internal hook-shaped flange directed away from the said one end and extending about the interior of the jaw,
      the face of the flange toward the said one end being conical and engageable with the external conical surface of the head of the lifting lug for pivoting the jaws apart to provide for entry of the head within the jaws, the face of the flange away from the said one end of the jaw being conical and engageable with the undercut conical surface of the head for pivoting the jaws toward one another against the lifting lug to enable the jaws to exert a pull on the lifting lug, and (C) a releasing sleeve slidably mounted on the shank of the lifting lug and having near the end facing the head of the shank a conical surface facing away from said end of the sleeve and increasing in diameter in a direction toward said end of the sleeve, the said end of the sleeve having a peripheral flange adapted to overlie the peripheral edge of the head of the lifting lug when the said end of the sleeve is directly adjacent the head, engagement at this time by the jaw flanges with the conical surface of the releasing sleeve pivoting the jaws apart to prevent engagement of the jaw flanges with the undercut conical surface on the head of the lifting lug and provide for escape of the head from the jaws.

2. In the combination specified in claim 1, the clamping jaws being pivotally retained on one another by a bolt and a nut threaded thereon, the bolt being lodged in semicircular recesses formed in the jaws at the ends away from the hook-shaped flanges, the head of the bolt having annular flanges engaging circular grooves in the jaws at one side, the nut having annular flanges engaging circular grooves in the jaws at the other side.

3. In the combination specified in claim 2, the clamping jaws having external protuberances extending thereabout at the ends where the hook-shaped flanges are located, the protuberances serving, under the influence of gravity, to move the hook-shaped flanges toward one another when the jaws are vertical and the ends thereof with the flanges lowermost, for engaging the lifting lug.

4. In combination, a lifting lug having a shank and a head, a pair of movably connected members engageable with the side of the head toward the shank so as to be adapted to exert a pull on the lifting lug, and a releasing sleeve slidably mounted on the shank of the lifting lug and having near the end facing the head of the shank a surface facing away from said one end of the sleeve and increasing in diameter in a direction toward said end of the sleeve, said surface being engageable by the said members so as to move them apart so as to provide for escape of the head from the jaws upon engagement of the releasing sleeve with the head of the lifting lug.

References Cited in the file of this patent

UNITED STATES PATENTS

| 2,366,982 | Pryor | Jan. 9, 1945 |
| 2,902,738 | Owens | Sept. 8, 1959 |

FOREIGN PATENTS

| 526,664 | Italy | Mar. 18, 1955 |
| 1,244,439 | France | Sept. 19, 1960 |